Feb. 17, 1931.                A. H. ROOS                1,793,015

QUICK ACTING HOSE COUPLING

Filed Feb. 23, 1928

INVENTOR
A. H. Roos
BY
ATTORNEY

Patented Feb. 17, 1931

1,793,015

UNITED STATES PATENT OFFICE

AXEL H. ROOS, OF CHICO, CALIFORNIA

QUICK-ACTING HOSE COUPLING

Application filed February 23, 1928. Serial No. 256,223.

This invention relates to couplings for hoses of all kinds, my principal object being to provide a coupling structure, to be associated with the adjacent ends of lengths of hose, or with a hydrant and a hose so constructed that coupling and uncoupling operations may be very quickly and easily carried out, without any turning of the hose or screwing together of any parts being necessary, while at the same time the coupling when made will have the necessary rigidity and water tight qualities.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views.

Figure 5:
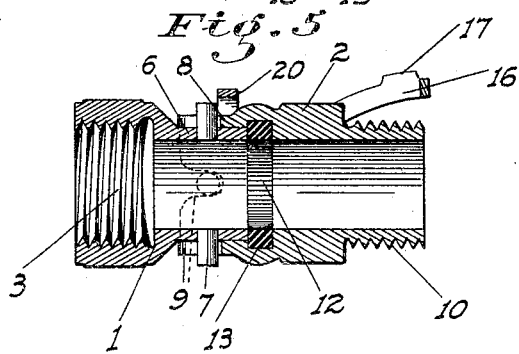
Fig. 5 is a sectional elevation of the assembled structure.

Referring now more particularly to the characters of reference on the drawings, the coupling consists of two main tubular members 1 and 2. The member 1 is tapped at one end as at 3 to receive the male element 4 of an ordinary coupling which is secured to a length of hose 5 as usual. Toward its opposite end the member 1 is provided with a straight-sided portion 6 of somewhat reduced diameter having short opposed pairs of trunnions 7 projecting outwardly therefrom. The member 2 at one end is formed as a sleeve 8 to fit over the portion 6, the sleeve being provided with longitudinal and opposed pairs of slots 9 open to the adjacent end and adapted to receive the trunnions therein. At its opposite end the member 2 is threaded as at 10 to engage the female member 11 of a standard coupling, which is attached to another length of the hose 5. The inner end of the member 6 when projected into the sleeve 8 is adapted to abut against a compressible washer 12 of rubber or the like which is pressed into a groove 13 formed in the member 2 inwardly of the slots as shown in Fig. 5.

Figure 1:
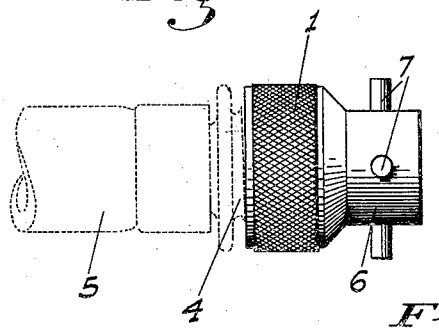
Fig. 1 is a side elevation of the male element of the coupling.
Figure 2:
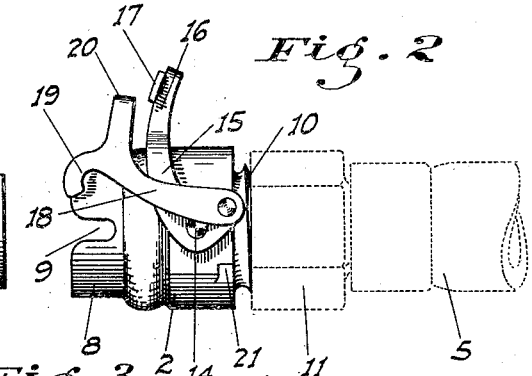
Fig. 2 is a side elevation of the female element of the coupling.
Figure 3:
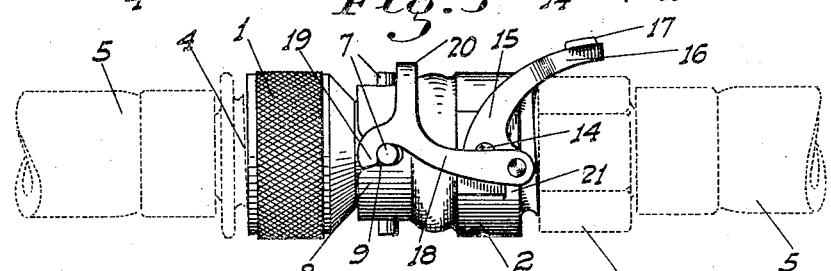
Fig. 3 is a side elevation of the coupling parts assembled.
Figure 4:
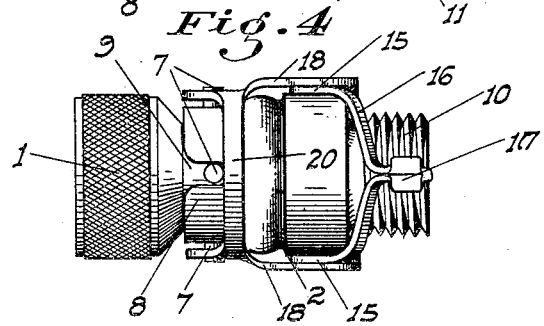
Fig. 4 is a top plan view of the same.

Projecting from the member 2 of opposite sides thereof and longitudinally alined with one pair of the slots 9 are short pivot pins 14 on which are turnable bellcrank levers 15. The long arms of these levers are connected by an integral cross piece 16 which extends across the member 2, said cross piece being provided with suitable finger grip means 17 so that the levers may be easily manipulated as a unit. The short arms of the levers project away from the slots and are connected to one end of longitudinally extending arms 18 which on their opposite ends are formed with hooks 19 for detachable engagement with the trunnions 7. A cross member 20 connects the arms and extends over the sleeve of the member 2 to prevent the arms from dropping down below the plane of the slots 9. This cross member of course projects from the edges of the arms opposite to the open ends of the hooks. The parts of the structure are so arranged that when the hooks are engaged with the trunnions and the member 6 is pressingly engaged with the washer 12, the pivotal connection of the arms 18 with the lever arms is then below the dead center line of the trunnions and lever pivots as shown in Fig. 3. The movement of the arms in this direction is limited by stop lugs 21 on the member 2 against which the short arms of the levers then abut as shown in Fig. 3. When the parts are in the above named position the hooks are prevented from being accidentally disengaged and both parts of the coupling are held in firm and water tight engagement with the washer disposed therebetween. The outer ends of the levers 15 then lie close to the coupling member 11. When it is desired to disconnect the coupling it is only necessary to swing the levers up by means of the grip 17 when the short arms of the levers will swing ahead of the dead center line as shown in Fig. 1, causing the hooks to be retracted from the trunnions. Said hooks may then be raised from the path of the outward movement of the trunnions in the slots and the parts disassociated from each other by sliding movement. When connecting the parts of the coupling together the above operations are of course reversed.

The position of levers 15 and the cross member 16 thereof when the parts of the coupling are engaged tends to prevent the levers from being possibly raised to release the hooks when the structure is engaged with the ground and the hose is being drawn along. Connecting the two levers and the two arms to each other, of course causes the movements of these parts to take place simultaneously so that a suitable manipulation of the member 17 will cause hooks to be actuated at the same time.

The use of two pairs of trunnions and slots enables the parts to be fitted together with never more than an initial quarter-turn to position the slots relative to the trunnions being necessary. This makes the device very adaptable for fire hose, which cannot very readily be rotated to any great extent.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A hose coupling comprising separate members arranged to be slidably fitted together at adjacent ends, opposed trunnions on one member, hook-arms for engagement with the trunnions, bellcrank levers pivoted on the other member and to which the arms are pivoted in offset relation to the pivots of the levers, an operating connection between the outer ends of the levers extending across the coupling, and stop means projecting outwardly from said other member to be engaged by said levers on opposite sides of the coupling member and limit the movement of the levers when the pivot of the hook-arms is just beyond dead center position with respect to the trunnions and lever pivots and permitting said connection to be then spaced from the coupling.

In testimony whereof I affix my signature.

AXEL H. ROOS.